US011182870B2

(12) United States Patent
Kulkarni et al.

(10) Patent No.: US 11,182,870 B2
(45) Date of Patent: Nov. 23, 2021

(54) SYSTEM AND METHOD FOR COLLECTIVE AND COLLABORATIVE NAVIGATION BY A GROUP OF INDIVIDUALS

(71) Applicant: McAfee, LLC, Santa Clara, CA (US)

(72) Inventors: Dattatraya Kulkarni, Bengaluru (IN); Srikanth Nalluri, Bengaluru (IN); Raja Sinha, Jharkhand (IN); Susmita Nayak, Santa Clara, CA (US); Krishnapur Venkatasubrahmanyam, Bengaluru (IN); Anjan Nayak, Bengaluru (IN); Raghuvir Songhela, Bengaluru (IN); Bhaavika Panjwani, Bengaluru (IN)

(73) Assignee: McAfee, LLC, San Jose, CA (US)

( * ) Notice: Subject to any disclaimer, the term of this patent is extended or adjusted under 35 U.S.C. 154(b) by 24 days.

(21) Appl. No.: 14/965,298

(22) Filed: Dec. 10, 2015

(65) Prior Publication Data

US 2016/0187141 A1  Jun. 30, 2016

Related U.S. Application Data

(60) Provisional application No. 62/096,641, filed on Dec. 24, 2014.

(51) Int. Cl.
*G06Q 50/30* (2012.01)
*H04W 4/21* (2018.01)
*G01C 21/34* (2006.01)

(52) U.S. Cl.
CPC ......... *G06Q 50/30* (2013.01); *G01C 21/3438* (2013.01); *H04W 4/21* (2018.02)

(58) Field of Classification Search
CPC ... G06Q 50/30; G01C 21/3438; H04W 4/206; H04W 4/21

(Continued)

(56) References Cited

U.S. PATENT DOCUMENTS 6,249,232 B1 * 6/2001 Tamura ............... G08G 1/163
                                                                180/167
6,252,544 B1   6/2001 Hoffberg
(Continued)

FOREIGN PATENT DOCUMENTS

CN      1705954       12/2005
CN    104044593        9/2014
(Continued)

OTHER PUBLICATIONS

Microsoft® Encarta® College Dictionary (2001), p. 412.*

*Primary Examiner* — Angelina Shudy
(74) *Attorney, Agent, or Firm* — Hanley, Flight & Zimmerman, LLC

(57) ABSTRACT

A technique includes providing real-time collective and collaborative navigation for one or more users to navigate to a destination. Each computing device associated with a member includes navigation objects that is pooled in a server and updated on each client device of users as one or more users navigate to a destination. A set of navigation objects may be created and distributed to the members within the group for the session, whereby the navigation objects are data structures that may be managed by a server. Based on a contextual trigger, the navigation object may be created or modified and used to provide a context to the navigation session. Navigation objects may continuously analyze user context and user situations to detect anomalies for one or more members in the group.

21 Claims, 9 Drawing Sheets

(58) Field of Classification Search
USPC .................................................... 701/537
See application file for complete search history.

(56) References Cited

U.S. PATENT DOCUMENTS

| | | | |
|---|---|---|---|
| 7,177,738 B2* | 2/2007 | Diaz | G06Q 10/06 701/29.3 |
| 7,197,395 B2* | 3/2007 | Kishigami | G01C 21/3641 340/995.21 |
| 7,545,825 B2* | 6/2009 | Zhu | H04L 12/189 370/312 |
| 8,346,277 B2* | 1/2013 | Kim | G01C 21/3438 455/456.1 |
| 8,649,962 B2* | 2/2014 | Davis | G01C 21/3492 701/117 |
| 8,660,794 B2* | 2/2014 | Currie | G01C 21/34 340/905 |
| 8,755,389 B1* | 6/2014 | Poutievski | H04L 45/245 370/395.31 |
| 8,798,928 B2* | 8/2014 | Muthuramalingam | G06Q 10/10 701/527 |
| 9,026,367 B2* | 5/2015 | Paek | G01C 21/3438 455/414.2 |
| 9,141,112 B1* | 9/2015 | Loo | G05D 1/0293 |
| 9,172,738 B1* | 10/2015 | daCosta | H04L 67/00 |
| 9,310,215 B2* | 4/2016 | Zhao | G01C 21/3691 |
| 9,651,391 B1* | 5/2017 | Hayes | G06Q 30/0255 |
| 9,689,695 B2* | 6/2017 | Margalit | G01C 21/3438 |
| 9,767,423 B2* | 9/2017 | Lord | G06Q 10/06 |
| 9,791,282 B2 | 10/2017 | Ould-Ahmed-Vall et al. | |
| 9,829,326 B2* | 11/2017 | Puhler | G01C 21/3438 |
| 9,883,340 B2* | 1/2018 | Boldyrev | H04W 4/023 |
| 9,939,280 B2* | 4/2018 | Tucker | G01C 21/3438 |
| 9,984,564 B2 | 5/2018 | Bogren et al. | |
| 10,222,219 B2 | 3/2019 | Ould-Ahmed-Vall et al. | |
| 10,598,502 B2* | 3/2020 | Gandiga | G01C 21/3438 |
| 2002/0184062 A1* | 12/2002 | Diaz | G06Q 10/06 705/7.15 |
| 2003/0100326 A1* | 5/2003 | Grube | H04W 84/08 455/515 |
| 2003/0191584 A1* | 10/2003 | Robinson | G01C 21/3407 701/428 |
| 2004/0073361 A1 | 4/2004 | Tzamaloukas et al. | |
| 2005/0125277 A1* | 6/2005 | Estrada | G06Q 10/10 705/301 |
| 2006/0020431 A1 | 1/2006 | Gipps et al. | |
| 2006/0161341 A1* | 7/2006 | Haegebarth | G08G 1/20 701/117 |
| 2007/0185645 A1 | 8/2007 | Chao et al. | |
| 2007/0293958 A1* | 12/2007 | Stehle | G06Q 10/04 700/30 |
| 2008/0046173 A1* | 2/2008 | Lappe | G01C 21/28 701/533 |
| 2008/0231507 A1* | 9/2008 | Burckart | G01C 21/20 342/357.52 |
| 2009/0005018 A1* | 1/2009 | Forstall | H04M 3/42348 455/414.1 |
| 2009/0024322 A1 | 1/2009 | Tomita et al. | |
| 2009/0276154 A1* | 11/2009 | Subramanian | G01C 21/20 701/469 |
| 2010/0033347 A1* | 2/2010 | Hayashi | G08G 1/017 340/905 |
| 2010/0083135 A1* | 4/2010 | Zawacki | G06F 17/30873 715/753 |
| 2010/0241346 A1 | 9/2010 | Waris | |
| 2010/0256852 A1* | 10/2010 | Mudalige | G08G 1/163 701/24 |
| 2010/0259370 A1* | 10/2010 | Chen | G01C 21/3438 340/425.5 |
| 2011/0003665 A1* | 1/2011 | Burton | G04F 10/00 482/9 |
| 2011/0035146 A1 | 2/2011 | Guha et al. | |
| 2011/0106592 A1* | 5/2011 | Stehle | G06Q 10/04 705/14.1 |
| 2011/0112747 A1 | 5/2011 | Downs et al. | |
| 2011/0118975 A1* | 5/2011 | Chen | G01C 21/3438 701/533 |
| 2011/0310733 A1 | 12/2011 | Tzamaloukas et al. | |
| 2012/0016585 A1* | 1/2012 | Muthuramalingam | G01C 21/20 701/527 |
| 2012/0046860 A1* | 2/2012 | Curtis | G06Q 30/0282 701/418 |
| 2012/0105637 A1 | 5/2012 | Yousefi et al. | |
| 2012/0173900 A1 | 7/2012 | Diab et al. | |
| 2012/0303274 A1 | 11/2012 | Su et al. | |
| 2012/0316777 A1 | 12/2012 | Kitta | |
| 2012/0323483 A1 | 12/2012 | Mutoh | |
| 2013/0027351 A1 | 1/2013 | Los | |
| 2013/0204526 A1* | 8/2013 | Boschker | G01C 21/3484 701/533 |
| 2013/0218445 A1 | 8/2013 | Basir | |
| 2013/0246923 A1 | 9/2013 | Iwai et al. | |
| 2013/0289862 A1 | 10/2013 | Chapman et al. | |
| 2013/0297207 A1 | 11/2013 | Mason et al. | |
| 2013/0332067 A1* | 12/2013 | Schlesinger | G01C 21/3438 701/422 |
| 2013/0345953 A1 | 12/2013 | Udeshi et al. | |
| 2014/0005941 A1* | 1/2014 | Paek | G01C 21/3415 701/533 |
| 2014/0046585 A1 | 2/2014 | Morris, IV et al. | |
| 2014/0046591 A1* | 2/2014 | Boldyrev | G01C 21/3438 701/533 |
| 2014/0088871 A1 | 3/2014 | Gueziec | |
| 2014/0129143 A1* | 5/2014 | Dave | G01C 21/3407 701/537 |
| 2014/0136414 A1 | 5/2014 | Abhyanker | |
| 2014/0156109 A1* | 6/2014 | Estkowski | G05D 1/101 701/2 |
| 2014/0180914 A1 | 6/2014 | Abhyanker | |
| 2014/0195146 A1 | 7/2014 | Grigsby et al. | |
| 2014/0214322 A1 | 7/2014 | Tsimhoni et al. | |
| 2014/0214933 A1* | 7/2014 | Liu | H04W 4/21 709/204 |
| 2014/0229105 A1 | 8/2014 | Lee et al. | |
| 2014/0236472 A1 | 8/2014 | Rosario | |
| 2014/0245395 A1* | 8/2014 | Hulse | H04L 63/101 726/4 |
| 2014/0277835 A1 | 9/2014 | Filev et al. | |
| 2014/0278032 A1 | 9/2014 | Scofield | |
| 2014/0278033 A1 | 9/2014 | Scofield | |
| 2014/0278047 A1 | 9/2014 | Bahl et al. | |
| 2014/0278061 A1 | 9/2014 | Michael | |
| 2014/0278070 A1 | 9/2014 | McGavran et al. | |
| 2014/0350841 A1* | 11/2014 | Xue | G01C 21/26 701/409 |
| 2015/0081210 A1* | 3/2015 | Yeh | A61B 5/7415 701/428 |
| 2015/0160014 A1* | 6/2015 | Hewitt | G01C 21/20 701/522 |
| 2016/0109251 A1* | 4/2016 | Thakur | G01C 21/3415 705/335 |
| 2016/0171521 A1 | 6/2016 | Ramirez et al. | |
| 2016/0187141 A1* | 6/2016 | Kulkarni | H04W 4/206 701/537 |
| 2016/0210853 A1 | 7/2016 | Koravadi | |
| 2016/0273930 A1* | 9/2016 | Wada | G01C 21/3438 |
| 2016/0294984 A1 | 10/2016 | Hamano | H04L 43/16 |
| 2016/0356612 A1* | 12/2016 | Beaurepaire | G01C 21/34 |
| 2017/0098373 A1 | 4/2017 | Filley et al. | |
| 2017/0098377 A1* | 4/2017 | Marco | G06Q 10/063118 |
| 2017/0118307 A1* | 4/2017 | Beaurepaire | H04L 67/327 |
| 2017/0130635 A1 | 5/2017 | Smith et al. | |
| 2017/0234691 A1 | 8/2017 | Abramson et al. | |
| 2017/0261335 A1* | 9/2017 | Hoffman | G04F 10/00 |
| 2017/0276500 A1* | 9/2017 | Margalit | G01C 21/3438 |
| 2017/0371333 A1* | 12/2017 | Nagy | G05D 1/0027 |
| 2018/0007063 A1* | 1/2018 | Looney | H04L 63/10 |
| 2019/0323847 A1 | 10/2019 | Ould-Ahmed-Vall et al. | |

(56) References Cited

U.S. PATENT DOCUMENTS

FOREIGN PATENT DOCUMENTS

| KR | 20130040361 | 4/2013 |
| KR | 20140102537 | 8/2014 |

* cited by examiner

SYSTEM AND METHOD FOR COLLECTIVE AND COLLABORATIVE NAVIGATION BY A GROUP OF INDIVIDUALS

CROSS-REFERENCE TO RELATED APPLICATIONS

This application claims the benefit of U.S. Provisional Application No. 62/096,641, filed Dec. 24, 2014, the entire contents of which is herein incorporated by reference.

TECHNICAL FIELD

Embodiments described herein generally relate to systems for navigation and route guidance, and more particularly to a system and method for group navigation, which uses collective and collaborative information from members in a group.

BACKGROUND ART

Use of digital tools for self-navigation, e.g. digital tools like GPS navigation devices, phones and tablets by individuals has been increasing rapidly—initially with GPS navigation devices, and now, more frequently, with navigation applications on smartphones. However, it is challenging for individuals in different locations to collaborate personally in order to navigate and reach a destination. For example, consider a scenario where a user who is new to New York City, wants to navigate and travel safely and efficiently from one location to another within the city. The user may use a combination of conventional solutions like GPS navigation maps, phone calls and text messages to the user's friends or other navigators within the city. However, these solutions are cumbersome, less insightful than an expert, can lead to miscommunication or distracted driving when used with driving, and may not provide sufficient guidance information as granular and insightful as human guidance. Additionally, these solutions require context switching between maps, calls, and chats in order to receive guidance information and, thus, can be distracting and non-productive when the user has to access multiple applications on the user's device to receive information during navigation.

Conventional crowdsourced approaches may provide an enriched route view on a map that can include real-time information on incidents, such as traffic jams and accidents. Other traditional applications may also provide enhanced information on a map view, such as crime data for a neighborhood. While these approaches can enrich a user's navigation experience, they cannot replace active real-time collaboration between individuals who are familiar with each other or the terrain and who can use the expertise of being familiar with an area to provide navigation guidance. Therefore, a method for real-time collective and collaborative navigation by a group of individuals that may use the expertise of individuals familiar with the user and the area within a navigation session would be desirable.

DESCRIPTION OF EMBODIMENTS

Figure 1:
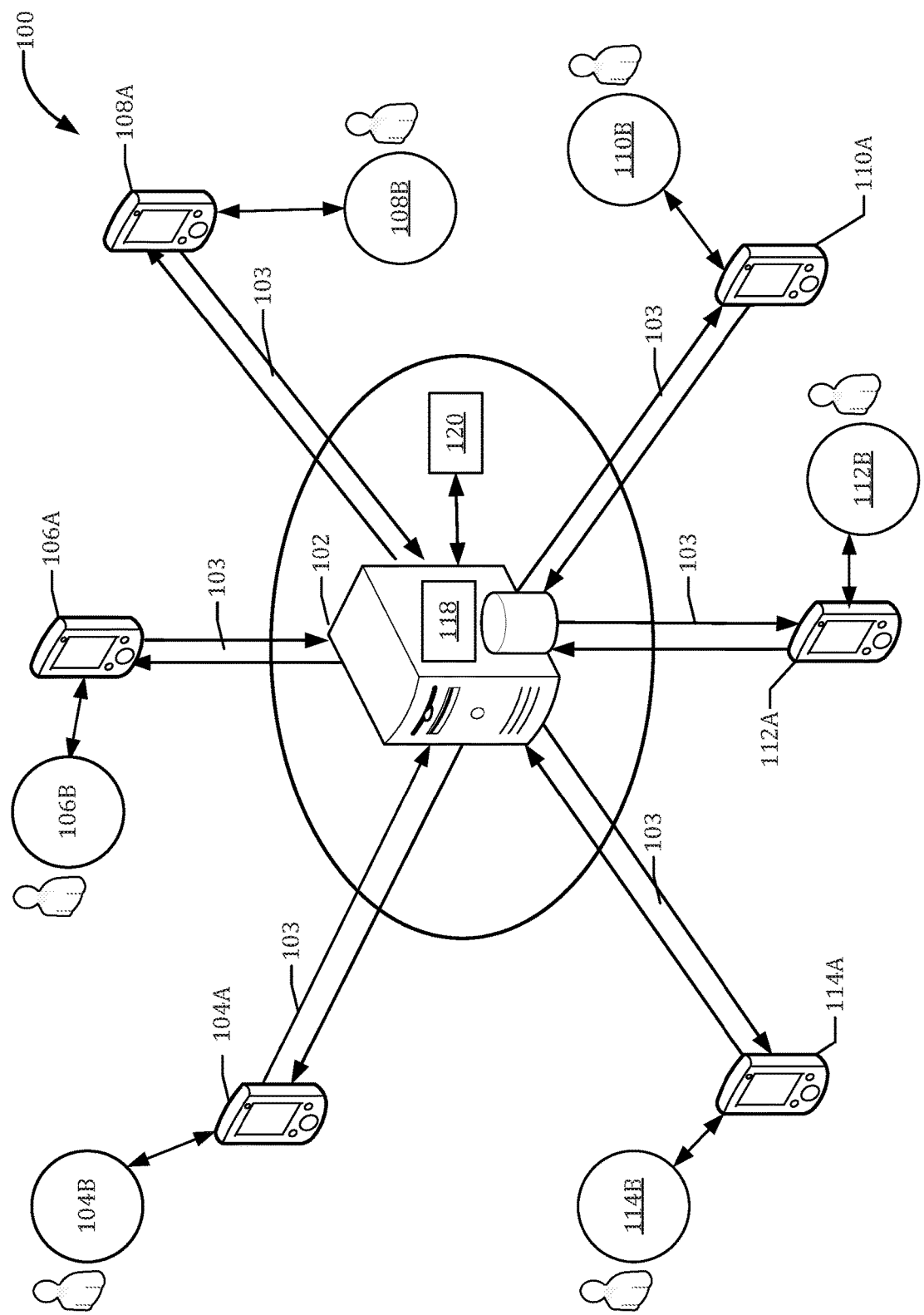
FIG. 1 is a block diagram that illustrates the general principle of collaborative communication described herein according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "cloud" can refer to cloud services that are made available to users on demand via the Internet from a cloud computing provider's servers that are fully managed by a cloud services provider.

As used herein, the term "shadowme" can refer to a navigation session between a shadower user/member and a shadowee user/member for facilitating a group navigation session. A shadowee member may request that a shadower member guide the shadowee member during the shadowee member's navigation from an origin to a destination. The shadower member may create a route that may be navigated by the shadowee member, and any deviations in the route may be monitored by the shadower member.

A technique provides for real-time collective and collaborative navigation for one or more users to navigate to a destination. The technique implements a distributed communication and context sharing mechanism with a group using an application that resides on each member's computing device. Each computing device associated with a member includes navigation objects. Within a group, the leader of the group may be self-selected by initiating group navigation among a set of individual members for a session. A set of navigation objects may be created and distributed to the members within the group for the session, whereby the navigation objects are data structures that may be managed by a cloud. Based on a contextual trigger, the navigation object may be created or modified and used to provide a context to the navigation session. Navigation objects may continuously analyze user context and user situations to detect anomalies for one or more members in the group. Based on anomaly detection, the system may generate alerts when a member is not actively using an application or when anomalies such as deviation from the determined route are detected.

Referring to the figures, FIG. 1 illustrates a system for collective and collaborative navigation among members of a group in a group navigation session according to one embodiment. As illustrated, FIG. 1 includes a system 100 for distributed communications and context sharing between members in a group whereby group members may collectively and collaboratively share information via navigation objects during a group navigation session.

As shown in FIG. 1, system 100 includes server 102, one or more client devices or clients 104A-114A and Network 103. Clients 104A-114A communicate with server 102 and with other client devices 104A-114A over Network 103. Each client 104A-114A may be associated with a user or group member who may be participating in a group navigation session with other group members via client's 104A-114A. Each client 104A-114A may include a desktop computer, a laptop computer, a smart phone, a tablet device, or any other type of electronic device having a processor and networking capabilities that can communicate over Network 103. In an embodiment, each client 104A-114A may include sensors that can capture sensor information from an environment around clients 104A-114A. Sensors attached to clients 104A-114A can include one or more sensors including accelerometers, a temperature sensor, a GPS sensor, a barometer sensor, and a gesture sensor. In other embodiment, clients 104A-114A may also receive information from other sensors, for example, sensors associated with wearable devices such as activity monitors, health rate monitors, or the like that may be worn by a user and can communicate information regarding the user to the client 104A-114A.

In an embodiment, each client 104A-114A may create navigation information that is communicated to the server 102 via a navigation application module or through a web browser that may communicate with server 102. Server 102 may include an intelligence engine 118 and an anomalies detection engine 120. Intelligence engine 118 may be configured to, in some embodiments, analyze information that is received from the clients and other external sources. Anomaly detection engine 120 may be configured to receive information from one or more external sources including live reports and traffic information so as to determine anomalies in navigation. Intelligence engine 118 communicates with anomaly detection engine 120 in order to coordinate navigation between the group members via their navigation objects. The server 102 may be anywhere including in a private or public cloud. Each client 104A-114A may include instructions for creating, updating, and/or sharing its local navigation object 104B-114B that is stored in memory on each client 104A-114A. Navigation objects 104B-114B may be aggregated in server 102 and shared with other members via their clients 104A-114A over Network 103. Navigation objects 104B-114B are abstract data structures such as, for example, a linked abstract data structure such as a graph and a tree data structure, having information that provides a navigation context for group members and their associated clients 104A-114A. The navigation objects 104B-114B may be represented, collectively, as a single entity that includes information for other navigation objects that is stored on the client 104A-114A. Any changes made to one or more local navigation objects 104B-114B are transmitted to server 102 and may be used to transmit updates to the local navigation objects on clients 104A-114A. Updated navigation objects can include updated context information of the navigation session on each client device 104A-114A. An embodiment of a navigation object 104B-114B can include one or more of the following attributes for a group member: route, destination, user profile, messages, alerts including warning and instructions, current location, location history, safety status, sharing status, privacy settings, members that are being shared information, role in the group (for example, role as a leader, a shadower, or a shadowee), accessories interface, sensors interface, heuristics to detect, anomaly, and history. These attributes are by way of example only, and other attributes may be used.

In operation, as group members navigate and/or traverse a route within a navigation session, contextual information for each member is captured by each respective navigation object 104B-114B at a group member client 104A-114A and transmitted to the server 102 for pooling in a navigation object pool. The navigation object pool may be used by an intelligence engine 118 to update navigation objects 104B-114B of the other group members 104A-114A during the navigation session. Contextual information can include location, routes relative to others, reputation of routes and location, audio and video that is received from other clients, activity, speed, health information, and safety status of group members associated with client.

Also shown in FIG. 1, clients 104A-114A are in communication with server 102 during the navigation session. Server 102 can include an intelligence engine 118 and an anomaly detection engine 120. Intelligence engine 118 may be configured to manage group navigation between group members associated with clients 104A-114A. In an embodiment, Server 102 may have visibility over the members in the group by analyzing, via the intelligence engine 118, information regarding the current state of navigation objects 104B-114B and anomalies that are received from the navigation objects 104B-114B, analyzing external parameters and analytics information that are received from external databases and analyze factors to detect anomalies. In an embodiment, server 102 may manage the navigation session by aggregating, via the intelligence engine 118, navigation objects 104B-114B related to a navigation session that are received from client's 104A-114A over Network 103 into a navigation object pool. Server 102 via the intelligence engine 118 may update the pooled navigation objects in response to updates made to each navigation object by the group members and automatic updates based on anomalies that are determined during navigation. In some examples, updates to the navigation objects 104B-114B can include updates to parameters and analytics including updates based on real-time traffic information, information and/or news on accidents and roadblocks on the navigation route, information received from sensors, location, network status, group member information, or the like. Updates to the navigation objects 104B-114B may be automatically transmitted to the group members via navigation objects 104B-114B on clients 104A-114A to provide an updated context during navigation.

In an embodiment, server 102 may be configured to provide anomaly detection during navigation of the group via an anomaly detection engine, shown below in FIG. 5, which is configured to detect anomalies during navigation by using real-time information, historical information, and/or location and other information that may be received from external databases. Intelligence engine 118 may be configured to receive information from anomaly detection engine 120 for coordinating group navigation. In an embodiment, server 102 may be configured to monitor member behavior by analyzing triggers associated with a group member and/or the member client 104A-114A and transmitting information to the other group members with respect to monitoring the member's navigation. Network 103 is not limited to a network of interconnected computer networks that use an internet protocol (IP), and may also include the Internet and other high-speed data networks and/or telecommunications networks that are configured to pass information back and forth to clients 104A-114A via Network 103.

Figure 2:
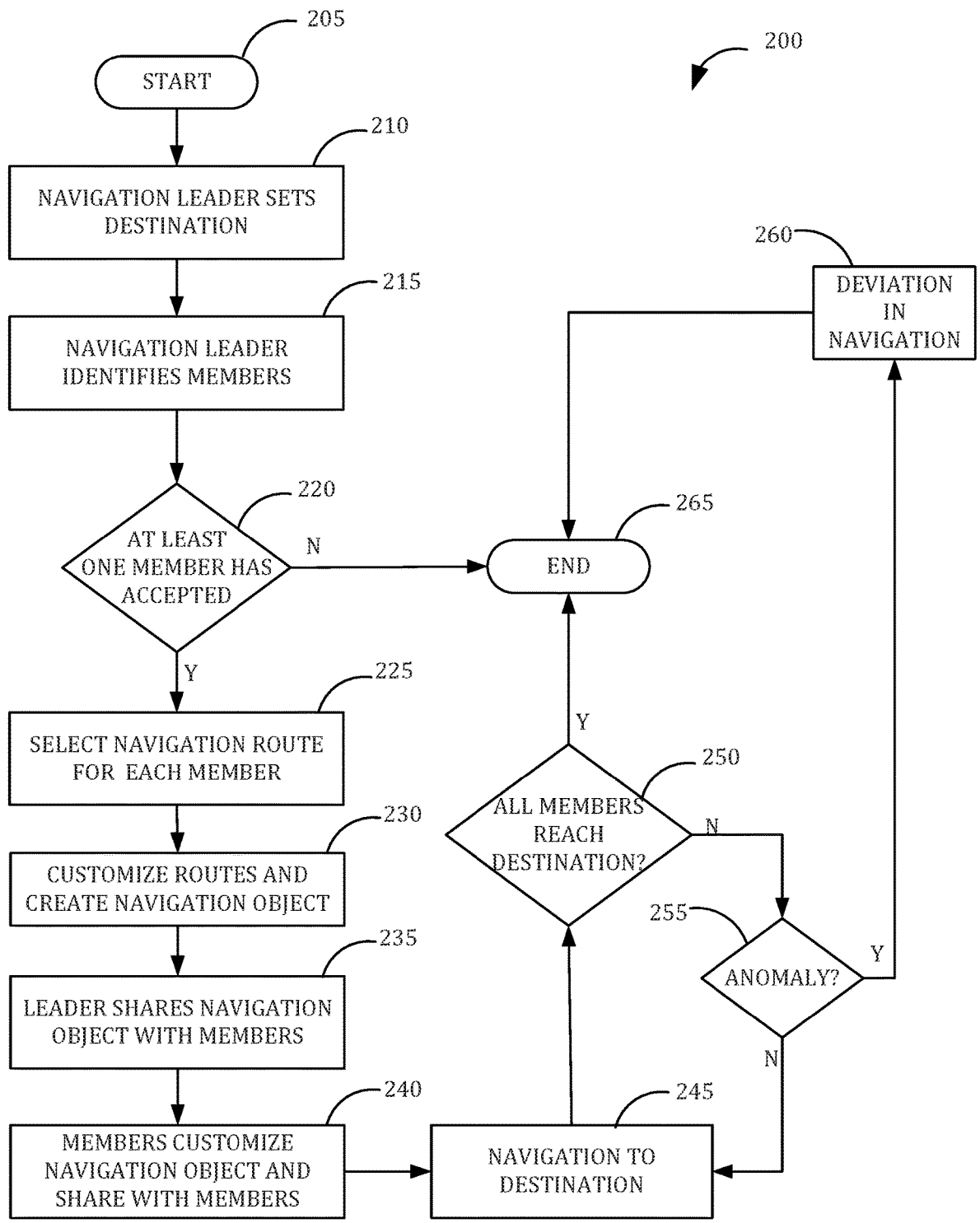
FIG. 2 is a flow chart that illustrates a method for creating a navigation session according to one embodiment.

FIG. 2 is a flow chart illustrating a process 200 for creating a group navigation session and navigating to a destination according to an embodiment of the invention. With continued reference to FIG. 1, process 200 begins in step 205. In 210, a group member, for example, a group member associated with a client 104A may select a destination to which the member wishes to travel. The group member may initiate the navigation session and may self-select the group member as the group leader. The group leader may use a navigation application module on client 104A or a web browser to identify a destination. In another embodiment, the group member initiating the navigation session may request another group member to be a leader.

In 215, the group leader may identify group members for participation in the navigation session. In embodiments, group members may be selected by the group leader or may be selected by the navigation module, from contacts of the group leader that are available from a storage location on client 104A or elsewhere such as remote databases connected to client 104A via Network 103. Group members that are selected for participation in the navigation session may receive an invitation via intelligence engine 118 on server 102 to join the navigation session from the group leader at clients of the group members. In embodiments, the invitation may be sent to clients of the group members via intelligence engine 118 or from the client 104A. While a distinction is made between the group leader and the group members participating in the navigation session, for ease of understanding of the steps in the embodiments below, reference to the group members can also include the group leader unless the steps below specifically refer to activities that are intended to be performed solely by the group leader.

In 220, the intelligence engine 118 may determine whether at least one member has accepted the invitation from the group leader. For example, intelligence engine 118 may receive one or more responses to invitations sent to the group members for participating in the navigation session. Intelligence engine 118 may analyze the invitations to determine whether at least one other group member has accepted the invitation. If at least one group member has not accepted the invitation (i.e., step 220="N"), then, in 265, process 200 ends where the navigation session between the group leader and other group members is canceled. However, in 220, if at least one group member has accepted the invitation (i.e., step 220="Y"), then, in 225, the group leader may select an appropriate route for the participating group members to navigate to the group leader's destination. The participating group members may be associated with the other clients 106A-114A. In an example, the group leader may receive information on the current location of each group member and may select an appropriate route to the destination based on the location.

In 230, the group leader may create customized routes for the participating group members including the group leader. Customization can include modifying the previously crated routes for each group member or for the group leader. Client 104A may also create navigation objects, for example, navigation object 104B for the group. The navigation object 104B may include the routes for the group leader and for the group members that are part of the navigation session.

In 235, client 104A may share the navigation object 104B with the group members. In an embodiment, client 104A may transmit the navigation object 104B to server 102, which communicates the navigation object 104B to each of the group members on clients 106A-114A.

In 240, each group member on client 106A-114A may customize the received navigation object 104B and share with the other group members. Customization can include modifying one or more attributes associated with a navigation object, including modifying the respective member's route, preferences of messages delivered from the group member to the group leader and to other group members, or the like. Each customized navigation object 104B may also be communicated to other group members and the group leader via the intelligence engine 118. Each client 104A-114A that receives the customized navigation object 104B may update the local navigation object 104B-114B on the client 104A-114A with the customized information. As navigation objects 104B-114B may be structured as a single entity, any changes made to a navigation object is transmitted to the other navigation objects and updated on each client 104A-114A.

In 245, group members and the group leader may use the navigation objects 104B-114B to navigate to the destination. As members navigate during the navigation session, each member's navigation object is updated with navigation information collected during the navigation session and uploaded to server 102. Further, the navigation information that is collected at server 102 may be transmitted to the other clients 104A-114A via intelligence engine 118 for updating the navigation objects of the other group members. In an embodiment, each group member may, in real-time, view, on a display at their respective clients, navigation information including their navigation routes as well navigation information of the other navigation group members as they navigate to the same destination via the navigation object. Navigation information can include navigation routes of the other group members, navigation context such as user state, device state, ambience state, history, route, destination, user profile, messages, alerts including warning and instructions, current location, location history, safety status, sharing status and history.

In 255, intelligence engine 118 may determine whether all group members, including the group leader, have reached the destination. For example, intelligence engine 118 may analyze updated navigation objects that are received from clients 104A-114A and may determine which group members have not reached the destination. If at least one group member has not reached the destination as a non-reaching group member (i.e., step 250="N"), then, in step 255 intelligence engine 118 determines if non-reaching group member has experienced an anomaly during navigation. Anomalies to the group member can include an accident to the group member, deviation in a route of the group member from a road closure, or other incident that results in a deviation in a navigation behavior of the group member. The server may analyze the current state of the navigation objects as well as real-time historical information and external data such as real-time traffic information, accident information, roadblocks, and sensor information from clients 104A-114A to determine whether there is an anomaly in the navigation for a particular group member. If intelligence engine 118 determines that there is no anomaly (i.e., step 255="N"), then process 200 proceeds to step 245 where the group navigation session continues and group members and group leaders continue the navigation session to navigate to the destination. If server determines there is an anomaly (i.e., step 255="Y"), then process 200 proceeds to step 260 where intelligence engine 118 may update the navigation objects of the group leader and/or group members to provide a deviation from the navigation route and travel to the non-reaching group member that has a navigation anomaly. The process ends in step 265.

Figure 3:
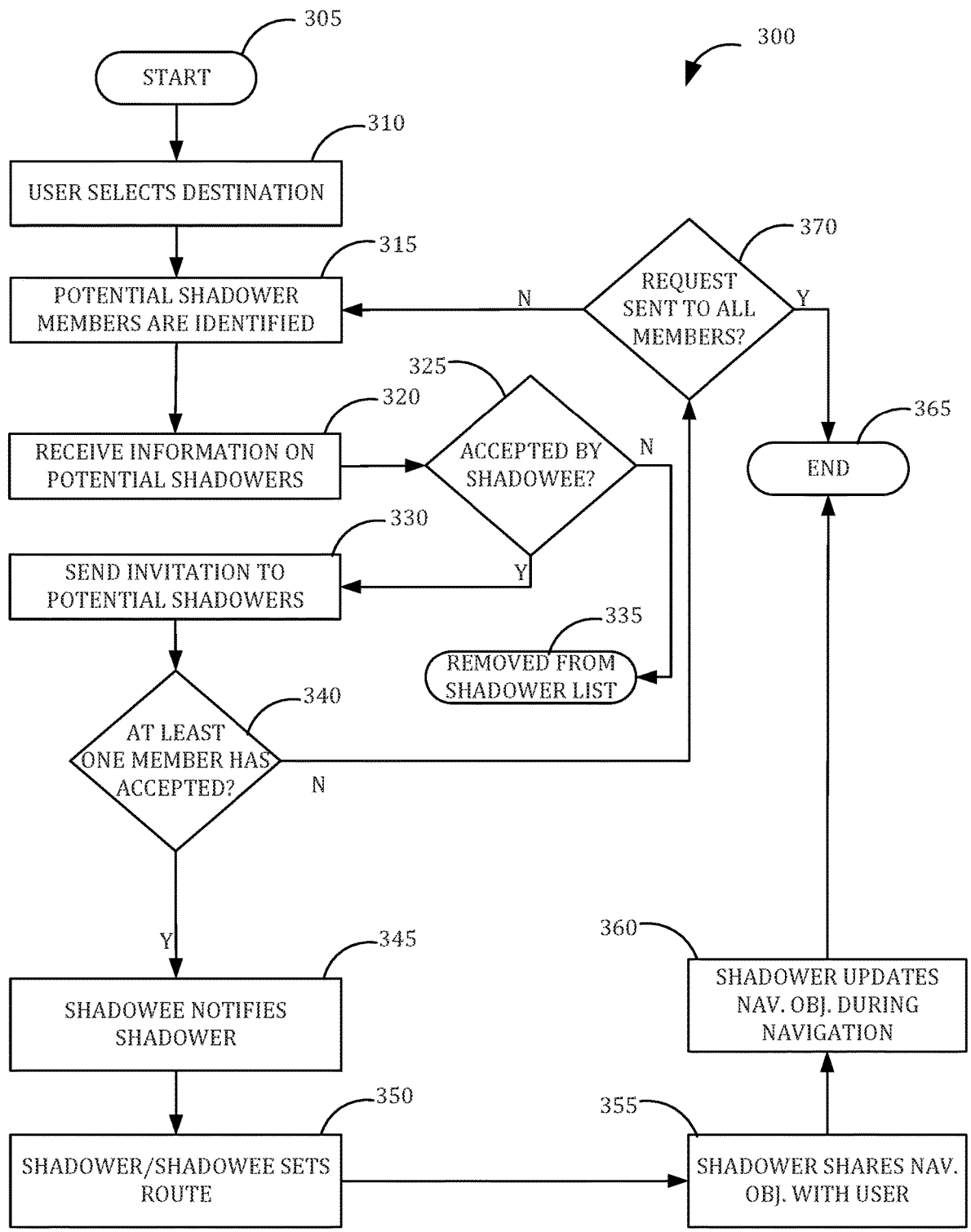
FIG. 3 is a flow chart that illustrates initiating a shadowme navigation session between two users according to one embodiment.

FIG. 3 is a flow chart illustrating a process 300 for initiating a "shadowme" navigation session between two or more users according to an embodiment of the invention. For example, a shadowme navigation session may be initiated by a first member (or user) associated with a client (i.e., a "shadowee") who may request a second member (or user) associated with a second client (i.e., a "shadower") to guide the shadowee in navigating from a current location or origin to a destination. Shadower and shadowee clients may be one of clients 104A-114A.

Process 300 begins in step 305. In 310, a shadowee may desire to travel to a location or destination, for example, a destination within a city and may select a destination to navigate towards from the shadowee's current location or origin by selecting the destination using, for example, a navigation application module on client 104A-114A.

In 315, potential shadower members may be identified for the shadowme navigation session. In an embodiment, members for the shadowme navigation session may be identified by intelligence engine 118 (FIG. 1) from contacts of the shadowee as one of several potential shadowers for the shadowme session. Shadowee contacts may be accessed by intelligence engine 118 from a storage location anywhere including a storage location on shadowee's client. In another embodiment, the shadowee contacts that are located within a certain threshold distance of the shadowee's current location may be identified as potential shadowers for the shadowme navigation session. In another embodiment, a random user or another volunteer member who has indicated a willingness to help strangers may be identified by intelligence engine 118 as a potential shadower. In an embodiment, the volunteer member may be familiar with the particular location, familiar with the general area of the city.

In 320, the intelligence engine 118 may send information to the shadowee on the selected potential shadowers. For example, intelligence engine 118 may send shadowee a notification that identifies the potential shadowers. The notification may also request that the shadowee provide a return notification of acceptance of any potential shadowers.

In 325, one or more potential shadowers may not be accepted by shadowee as a potential shadower. If shadowee rejects one or more potential shadowers (i.e., step 325="N"), then, in 335, the potential shadower is removed from the list of potential shadowers by intelligence engine 118. If shadowee accepts the selected potential shadowers (i.e., step 325="Y"), then, in 330, the intelligence engine 118 may send an invitation to the selected potential shadowers. For example, the shadowee may create a navigation object for the navigation session on the shadowee's client and send an invitation including the navigation object via intelligence engine 118 to the non-rejected potential shadowers. In an embodiment, the navigation object may be similar to navigation objects 104B-114B shown and described in FIG. 1.

In 340, intelligence engine 118 may determine whether at least one member has accepted. For example, intelligence engine 118 may receive one or more responses to invitations sent to the selected shadowme members and may analyze the responses to determine whether at least one potential shadower has accepted the invitation. If at least one selected potential shadower has not accepted the invitation (i.e., step 340="N"), then, in 370, the intelligence engine 118 may determine if the invitation was sent to all potential shadowers. If the request was sent to all potential shadowers (i.e., step 370="Y"), then process 300 ends in 365. If the request was not sent to all potential shadowers (i.e., step 370="N"), then, in 315, additional potential shadowers are identified. However, in 340, if at least one selected potential shadower has accepted the invitation (i.e., step 340="Y"), then, in 345, shadowee notifies the selected potential shadower from the accepted invitations as being the selected shadower member (shadower for the shadowme navigation session).

In 350, the shadower may select the route that the shadowee may follow to the destination. The shadower may also add the route to the navigation object that was previously received from the shadowee to create an updated navigation object.

In 355, the shadower may share the updated navigation object with the shadowee. In an embodiment, shadower may transmit the navigation object to the client of shadowee via intelligence engine 118.

In 360, the shadowee may navigate to the destination using the route selected by the shadower. During navigation, shadower may monitor the shadowee using the client of the shadower. During navigation, the navigation object of the shadowee is continuously updated (in real-time) with current information of the shadowee as the shadowee traverses the route and transmitted to intelligence engine 118 via Network 103. Updates to the navigation object are received by the shadower client, who may use the navigation object to monitor the shadowee navigation. The shadower may update the route taken by the shadowee, which subsequently sends updates back to the shadowee client via intelligence engine 118. Process 300 ends in step 365.

Figure 4:
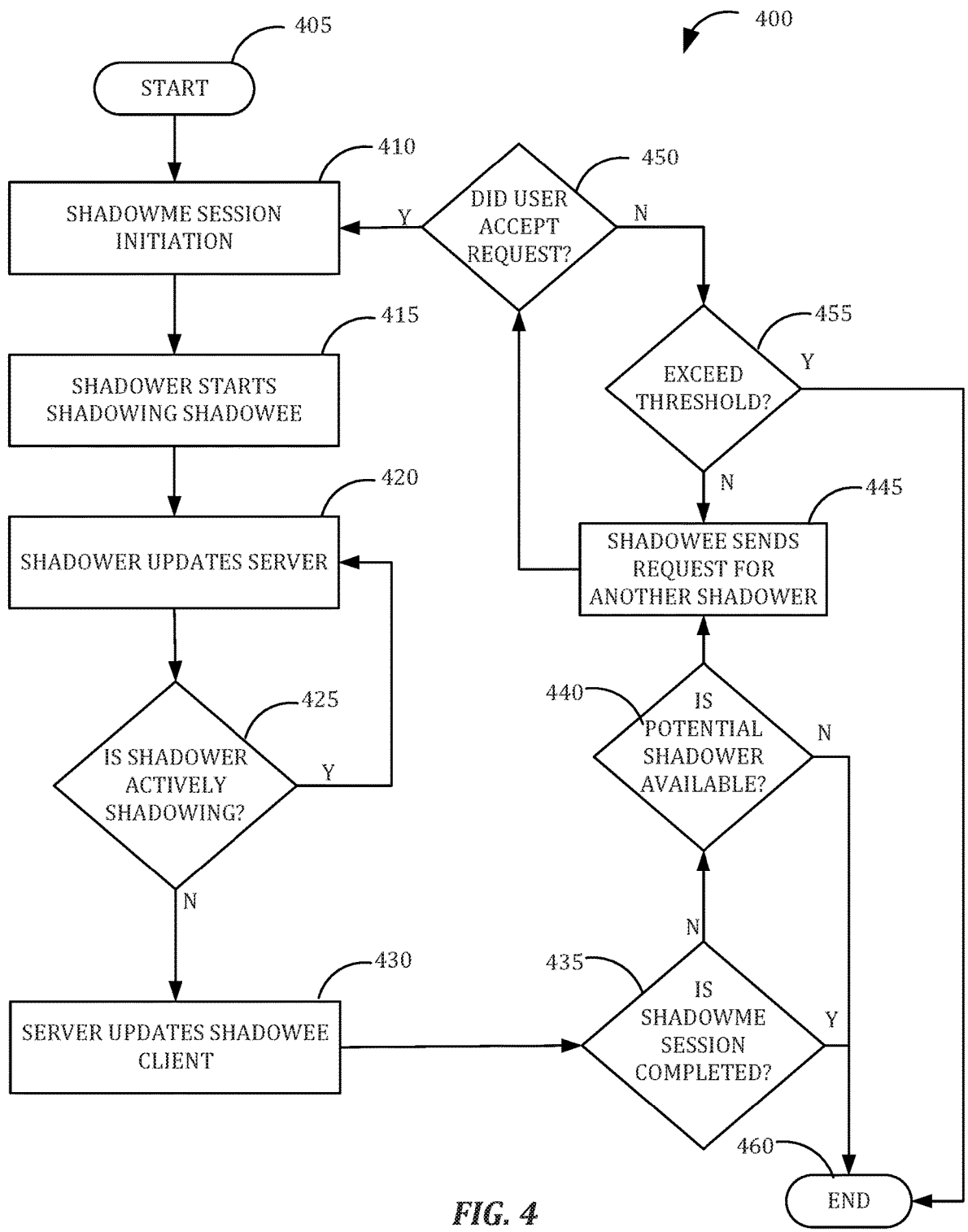
FIG. 4 is a flow chart that illustrates a method for actively monitoring a shadowee during the shadowme session of FIG. 3 according to one embodiment.

FIG. 4 is a flow chart illustrating a process 400 for navigating to a destination using a "shadowme" navigation session according to an embodiment of the invention. Process 400 begins in step 405.

In 410, a shadowme navigation session may be initiated by a shadowee for determining a navigation route and creating a navigation object. In an embodiment, the shadowme navigation session may be initiated using steps 305-355 of process 300 that was described in FIG. 3.

In 415, shadower may shadow the shadowee while the shadowee navigates to the destination. In an embodiment, shadower may view shadowee movements on the shadower client in real-time automatically. Particularly, as the shadowee navigates to the destination using the route identified in the navigation object on the shadowee client, the navigation object may be continuously updated (in real-time) on shadowee client and transmitted to intelligence engine 118 via Network 103. In an embodiment, the shadower may be stationary while monitoring movements of the shadowee during the shadowme session. Updates to the navigation object may be received by the shadower client, who may use the navigation object to monitor the shadowee's navigation. Monitoring the shadowee navigation can include monitoring a map depicting a route being taken by shadowee, updates to traffic conditions that are represented on the navigation map, alerts based on traffic conditions, or the like. Shadower may monitor shadowee activity using the navigation module or a web browser, which displays the shadowme navigation session in real-time. Updates to the navigation object can include detection of anomalies and communicating the anomaly to the shadower and/or shadowee. Anomaly detection can include several parameters and analytics, including information on traffic and real-time information/news, accidents and road blocks from a traffic service, information from sensors that relate to client devices or wearable devices and real-time information on the actual driving behavior of shadowee including route deviations, sudden changes in speed, or the like. The shadower may respond to an anomaly by contacting a third party, such as a rescue, repair, or Emergency Medical Transport (EMT) service of the problem affecting the member having the anomaly.

In 420, the shadower client may send updates having shadower activity to the intelligence engine 118 during the shadowme session. In an embodiment, shadower activity during the navigation session may be captured and sent to intelligence engine 118. Shadower may actively shadow the shadowee while the shadowee is on the move by exchanging audio, video, text messages, or the like to guide shadowee during navigation. In an embodiment, shadower may update the route taken by the shadowee based on real-time traffic information, which subsequently sends updates back to the shadowee client via intelligence engine 118. Shadower activity with respect to the shadowme navigation session updates the navigation object of shadower in the background on shadower client which is sent to intelligence engine 118. Updates to intelligence engine 118 may occur periodically and, in an embodiment, may be sent to intelligence engine 118 every 10 seconds. Other times greater than or less than 10 seconds is also contemplated in embodiments.

In 425, intelligence engine 118 may determine whether shadower is actively shadowing the shadowee. Intelligence engine 118 may determine, based on information in the navigation object of shadower client whether shadower is actively monitoring/shadowing the shadower. If intelligence engine 118 determines that shadower is actively shadowing the shadowee (i.e., step 425="Y"), then, step 425 proceeds to step 420 where shadower may send updates to intelligence engine 118 with shadower activity. However, if intelligence engine 118 determines that shadower is not actively shadowing the shadowee (i.e., step 425="N"), then, in 430, intelligence engine 118 may send a notification to shadowee client that shadower is not actively shadowing the shadowee. Intelligence engine 118 may send updates to the shadowee's navigation object in real-time to update shadowee's navigation object.

In 435, intelligence engine 118 may determine whether the shadowme navigation session is completed. For example, the shadowme session may be completed when the shadowee reaches the destination in the route and the shadowme session is not completed when the shadowee is not at the destination. If the shadowme navigation session is completed (i.e., step 435="Y"), then process 400 ends in step 460. However, if the shadowme navigation session is not completed (i.e., step 435="N"), then, in step 440, intelligence engine 118 may determine if a potential shadower is available for the shadowme session. For example, a potential shadower may include a status flag that indicates that the potential shadower is not available or willing to act. For example, each user may set a status flag in a navigation object that can define the user's privacy policies and access permissions of the user's social networks that may be provided to the intelligence engine 118. The intelligence engine 118 may identify the potential shadower for the shadowme navigation session, who may be selected from contacts of the shadowee, volunteer members or other people associated with shadowee as determined from one or more communications made between shadower and shadowee, for example, social networking sites, emails, or the like. If a potential shadower is not available (i.e., step 440="N"), then process 400 ends in step 460. However, if a potential shadower is available to shadow the shadowee (i.e., step 440="Y"), then, in step 445, intelligence engine 118 may send a request to the potential shadower in response to determining that a shadower is available. The shadowee may send an invitation to the selected potential shadower by updating the navigation object on the shadowee's client and sending an invitation including the navigation object to the contact identified by the shadowee. In an embodiment, the invitation may be sent to another potential shadower via intelligence engine 118 on server 102.

In 450, intelligence engine 118 may determine whether the potential shadower has accepted the invitation to be a shadower. For example, intelligence engine 118 may receive a response to the invitation sent to the selected potential shadower and may analyze the response to determine whether potential shadower has accepted the invitation. If the potential shadower has not accepted the invitation (i.e., step 450="N"), then, in 455, intelligence engine 118 may determine if a threshold has been exceeded for adding another shadower. In some embodiments the threshold can include exceeding a predefined time limit for adding another shadower, exceeding a predefined number of shadowers that have received the invitations, or exceeding a number of iterations for sending an invitation to potential shadowers. If the threshold has not been exceeded (i.e., step 455="N"), then process 400 proceeds to step 445 where intelligence engine 118 may send a request to a potential shadower. However, if threshold has been exceeded (i.e., step 455="Y"), the process 400 ends in 460.

However, in 450, if the potential shadower has accepted the invitation (i.e., step 450="Y"), then, in 410, a shadowme session is initiated and the potential shadower is now a shadower who may actively track a navigation of the shadowee. The process ends when the shadowme session is completed in 435 where the shadowee reaches the destination.

Figure 5:
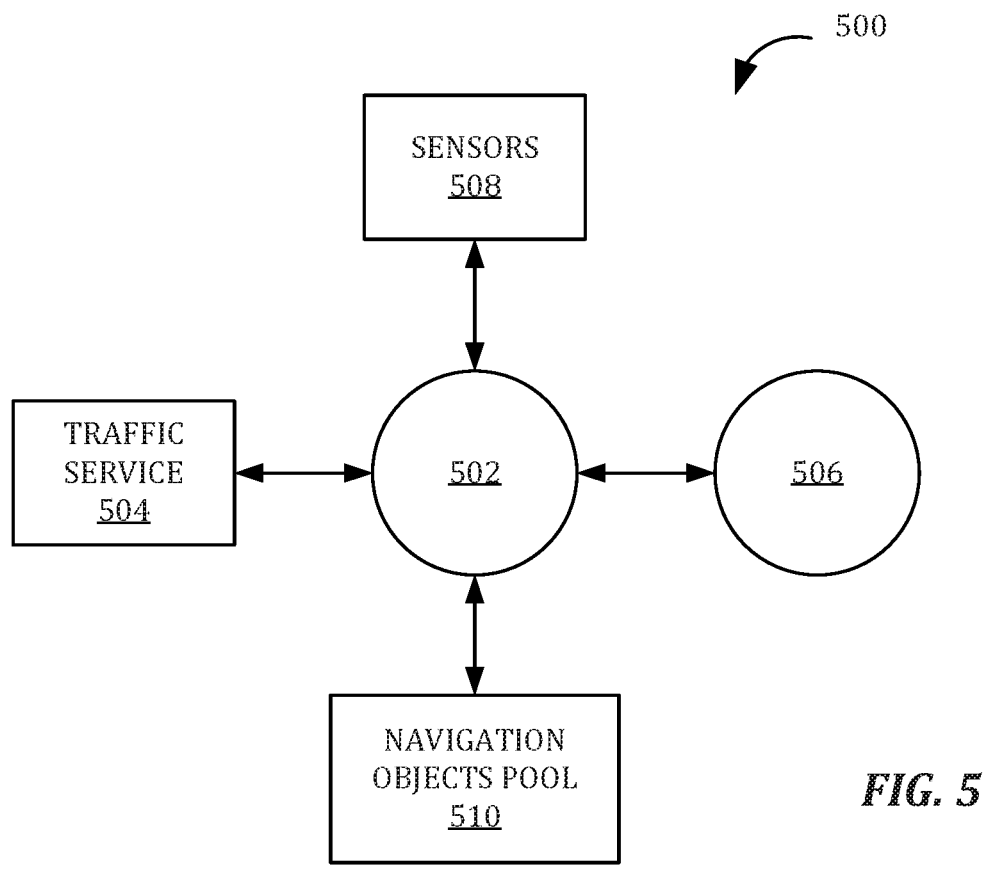
FIG. 5 is a diagram that depicts a system for anomaly detection according to one embodiment.
Figure 6:
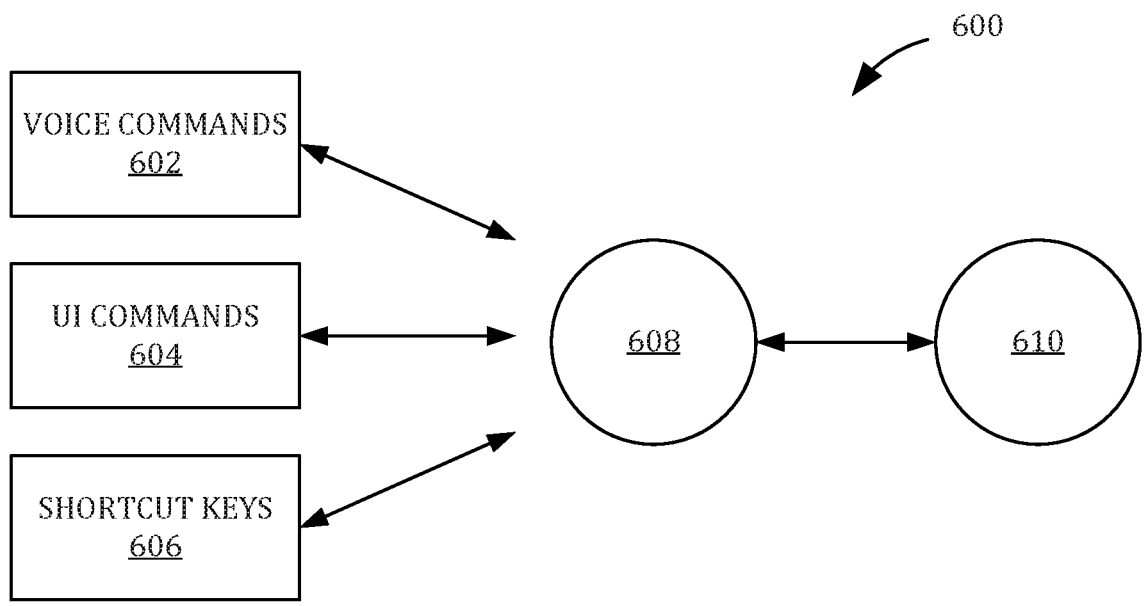
FIG. 6 is a diagram that depicts a system for transmitting information for anomaly detection according to one embodiment.

FIGS. 5-6 depict system diagrams that may be used for detecting anomalies according to one embodiment. As shown in FIG. 5, system 500 may be used to detect anomalies during navigation and may, automatically, in real-time, update navigation objects that are sent to client devices 104A-114A in response to the anomaly. Anomalies can include accidents to a user during navigation, unavailability of a network to communicate with other members, mishap to an automobile include break-down to vehicles. System 500 may include an anomaly detection engine 502, third party traffic service 504, user driving behavior engine 506, sensors 508, and navigation objects pool 510. Anomaly detection engine 502 may be similar to anomaly detection engine 120 of FIG. 1 and may be configured to receive information from one or more systems such as a traffic service 504, user behavior engine 506, and sensors 508 over a network, for example, Network 103 (FIG. 1). Anomaly detection engine 502 may be configured as a server component and may be configured to receive information from, in some embodiments, external sources such as sensors 508, traffic services 504, user clients 104A-114A and update navigation objects in a navigation objects pool 510 for one or more members in the navigation session.

Information traffic service 504 may provide third-party information to anomaly detection engine 502 that may include, in some embodiments, real-time traffic information, information and/or news on accidents and roadblocks including information on an alternate navigation route. Anomaly detection engine 502 may communicate information to the intelligence engine 118 (FIG. 1), which may analyze the received information on the server 102 and automatically modify the navigation objects, for example, navigation objects 104B-114B, in navigation objects pool 508 based on several parameters and analytics, including information on traffic and real-time information/news, accidents and road blocks from traffic service 504, sensors information from sensors 508 and real-time information on the actual driving behavior of a member including route deviations, sudden changes in speed, or the like. The modified navigation objects within navigation objects pool 508 may be automatically communicated to the other members in the group that are participating in the navigation session. A determination of an anomaly may be based on a deviation based on a standard navigation behavior of one or more members in the navigation session For example, a deviation can include a sudden speed reduction from 60 miles per hour (mph) to 0 mph. An alert may be issued to all members. One or more members in a group navigation situation may respond to an anomaly by contacting a third party, such as a rescue, repair, or Emergency Medical Transport (EMT) service as well as notifying other members of the problem affecting the member having the anomaly. A member may respond to another member's anomalous situation either through voice commands, via application user interfaces or gesture or key shortcuts, as is shown in FIG. 6. During any anomaly, client devices used during navigation may be set into a high-alert mode where any messages that are delivered between client devices is converted into audio and played automatically on the user that is experiencing the anomaly.

FIG. 6 depicts a system 600 where, a user or group member of a group navigation session may respond to an anomaly. The user that is not experiencing the anomaly may respond to another user's anomalous situation by transmitting updates to a navigation route, help, or the like via several modes on the user client, for example, client 104A-114A through voice commands 602, user interface commands 604 or shortcut keys 606. A command translator engine 608, may be another server component on server 102, and may be configured to interpret the commands that are received from client devices 104A-114A and update a navigation object 610 in navigation objects pool 508 (FIG. 5) based on the information received in the commands. Updated information to the navigation object 610 may be transmitted to the user in the anomalous situation and/or may be translated into voice commands that the user may receive. Voice commands may also be sent, in general to a particular member or to the navigation group. For example, a command "take a right turn" may be transmitted as an update to a navigation object 610 that is reflected on a map view of a user receiving the updated navigation object 610.

In an example, a sample voice command to members (MemX) or to the Group (Group) can include the following instructions.

<Mem1, Mem2> Take a <right/left> turn from <here>
<Mem3> stop at <here>
<Group> switch to <Route2>
<Group> Mem1 is stuck <here>
<Group> Mem1 met an accident <here>
<Group> Please arrive <here>

Figure 7:
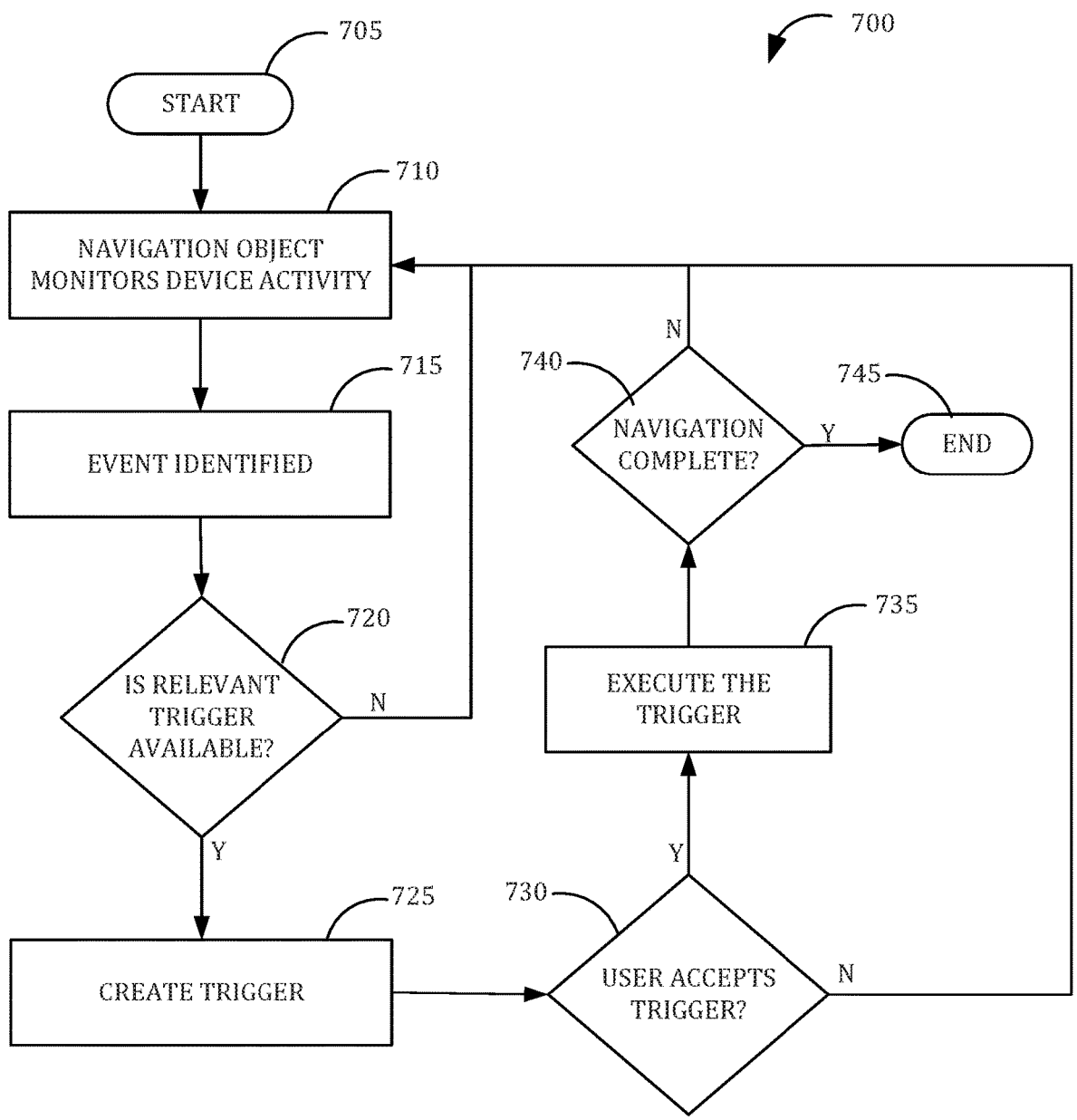
FIG. 7 is a flow chart that illustrates a method for receiving triggers during a navigation session according to one embodiment.

FIG. 7 is a flow chart illustrating a process 700 for providing triggers that may be sent to one or more group members during navigation according to an embodiment of the invention. Process 700 begins in step 705.

In 710, a navigation object on a client device may be used to monitor activity on the client. Client device may be one client's 104A-114A (FIG. 1). Also, in an embodiment, monitored activity may include activity that is monitored while the user of the client is in a public location, while the user is traveling, when the user wants to track the user's activity during certain time periods, or when the user manually changes the user's tracking preferences for tracking at user-defined times or activities. All activities may be captured by navigation object and stored on client. Also, the navigation object may be transmitted to the server 102 (FIG. 1).

In 715, an event that may require a trigger is identified. One or more events that may be require a trigger may be stored in memory on the client. The navigation object may detect one or more events based on location of the user (e.g., at a gym, at a restaurant, at work), by the time of day, by activities that are calendared in a calendar application or other application on the client, through external factors like weather, traffic, incidents, safety reputation of the route taken while the user is navigating, communications made by the user using the client including text messages, and notification from server services that are received on the client.

In 720, client may determine whether a relevant navigation trigger is available. Navigation triggers, in some embodiments, are messages that are received on a client device and may include: a suggestion to a user to inform the user's contact upon the user's arrival at a destination such as an airport or other destination that is not the user's home or office, a recommendation to the user to request a shadowme session upon hiring a taxicab, a recommendation to the user to request that the user notifies a trusted contact to track the user's trip home during the night or from a remote location, or the like. If a relevant trigger is not available (i.e., step 720="N"), then step 720 proceeds to step 710 where navigation object may be used to further monitor any activity on client. However, if a relevant trigger is available, (i.e., step 720="Y"), then, in step 725, a trigger is created. The trigger, in an example, can include a recommendation to ask a trusted contact to shadow the user when the user is traveling late at night.

In 730, the user is presented with the trigger as a notification. The user, in an embodiment, may be requested to accept the trigger. In another embodiment, the user may be presented with several triggers that the user may select. If the user does not accept the trigger (i.e., step 730="N"), then step 730 proceeds to step 710 where navigation object may be used to monitor device activity. However, if the user accepts a trigger (i.e., step 730="Y"), then in 735, the navigation object on client executes the trigger. Execution can follow, for example, creation of a shadowme session and execution of the shadowme session discussed about in relation to FIGS. 3 and 4.

In 740, client may determine if navigation is complete. Navigation may be completed if, in an example, the shadowme session is completed. If navigation is completed (i.e., step 740="Y"), then process 700 ends in 745. However, if navigation has not completed (i.e., step 740="N"), then process 700 proceeds to step 710.

Figure 8:
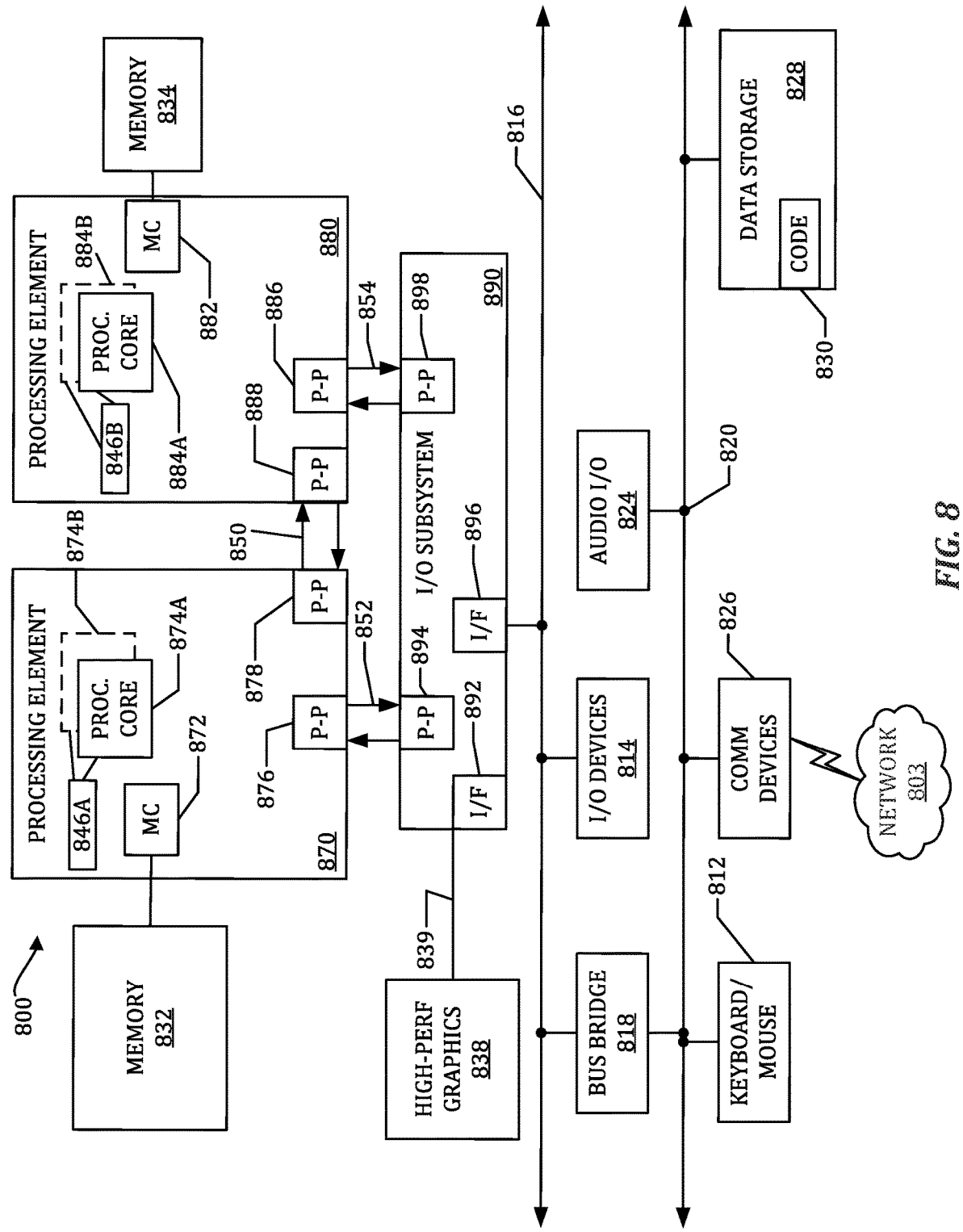
FIG. 8 is a diagram illustrating a computing device for use with techniques described herein according to one embodiment.

Referring now to FIG. 8, a block diagram illustrates a programmable device 800 that may be used within server service 102, user clients 104A-114A in accordance with one embodiment. The programmable device 800 illustrated in FIG. 8 is a multiprocessor programmable device that includes a first processing element 870 and a second processing element 880. While two processing elements 870 and 880 are shown, an embodiment of programmable device 800 may also include only one such processing element.

Programmable device 800 is illustrated as a point-to-point interconnect system, in which the first processing element 870 and second processing element 880 are coupled via a point-to-point interconnect 850. Any or all of the interconnects illustrated in FIG. 8 may be implemented as a multi-drop bus rather than point-to-point interconnects.

As illustrated in FIG. 8, each of processing elements 870 and 880 may be multicore processors, including first and second processor cores (i.e., processor cores 874a and 874b and processor cores 884a and 884b). Such cores 874a, 874b, 884a, 884b may be configured to execute instruction code in a manner similar to that discussed above in connection with FIGS. 1-7. However, other embodiments may use processing elements that are single core processors as desired. In embodiments with multiple processing elements 870, 880, each processing element may be implemented with different numbers of cores as desired.

Each processing element 870, 880 may include at least one shared cache 846. The shared cache 846a, 846b may store data (e.g., instructions) that are utilized by one or more components of the processing element, such as the cores 874a, 874b and 884a, 884b, respectively. For example, the shared cache may locally cache data stored in a memory 832, 834 for faster access by components of the processing elements 870, 880. In one or more embodiments, the shared cache 846a, 846b may include one or more mid-level caches, such as level 2 (L2), level 3 (L3), level 4 (L4), or other levels of cache, a last level cache (LLC), or combinations thereof.

While FIG. 8 illustrates a programmable device with two processing elements 870, 880 for clarity of the drawing, the scope of the present invention is not so limited and any number of processing elements may be present. Alternatively, one or more of processing elements 870, 880 may be an element other than a processor, such as an graphics processing unit (GPU), a digital signal processing (DSP) unit, a field programmable gate array, or any other programmable processing element. Processing element 880 may be heterogeneous or asymmetric to processing element 870. There may be a variety of differences between processing elements 870, 880 in terms of a spectrum of metrics of merit including architectural, microarchitectural, thermal, power consumption characteristics and the like. These differences may effectively manifest themselves as asymmetry and heterogeneity amongst processing elements 870, 880. In some embodiments, the various processing elements 870, 880 may reside in the same die package.

First processing element 870 may further include memory controller logic (MC) 872 and point-to-point (P-P) interconnects 876 and 878. Similarly, second processing element 880 may include a MC 882 and P-P interconnects 886 and 888. As illustrated in FIG. 8, MCs 872 and 882 couple processing elements 870, 880 to respective memories, namely a memory 832 and a memory 834, which may be portions of main memory locally attached to the respective processors. While MC logic 872 and 882 is illustrated as integrated into processing elements 870, 880, in some embodiments the memory controller logic may be discrete logic outside processing elements 870, 880 rather than integrated therein.

Processing element 870 and processing element 880 may be coupled to an I/O subsystem 890 via respective P-P interconnects 876 and 886 through links 852 and 854. As illustrated in FIG. 8, I/O subsystem 890 includes P-P interconnects 894 and 898. Furthermore, I/O subsystem 890 includes an interface 892 to couple I/O subsystem 890 with a high performance graphics engine 838. In one embodiment, a bus (not shown) may be used to couple graphics engine 838 to I/O subsystem 890. Alternately, a point-to-point interconnect 839 may couple these components.

In turn, I/O subsystem 890 may be coupled to a first link 816 via an interface 896. In one embodiment, first link 816 may be a Peripheral Component Interconnect (PCI) bus, or a bus such as a PCI Express bus or another I/O interconnect bus, although the scope of the present invention is not so limited.

As illustrated in FIG. 8, various I/O devices 814, 824 may be coupled to first link 816, along with a bridge 818 which may couple first link 816 to a second link 820. In one embodiment, second link 820 may be a low pin count (LPC) bus. Various devices may be coupled to second link 820 including, for example, a keyboard/mouse 812, communication device(s) 826 (which may in turn be in communication with the computer network 803), and a data storage unit 828 such as a disk drive or other mass storage device which may include code 830, in one embodiment. The code 830 may include instructions for performing embodiments of one or more of the techniques described above. Further, an audio I/O 824 may be coupled to second link 820.

Note that other embodiments are contemplated. For example, instead of the point-to-point architecture of FIG. 8, a system may implement a multi-drop bus or another such communication topology. Although links 816 and 820 are illustrated as busses in FIG. 8, any desired type of link may be used. Also, the elements of FIG. 8 may alternatively be partitioned using more or fewer integrated chips than illustrated in FIG. 8.

Figure 9:
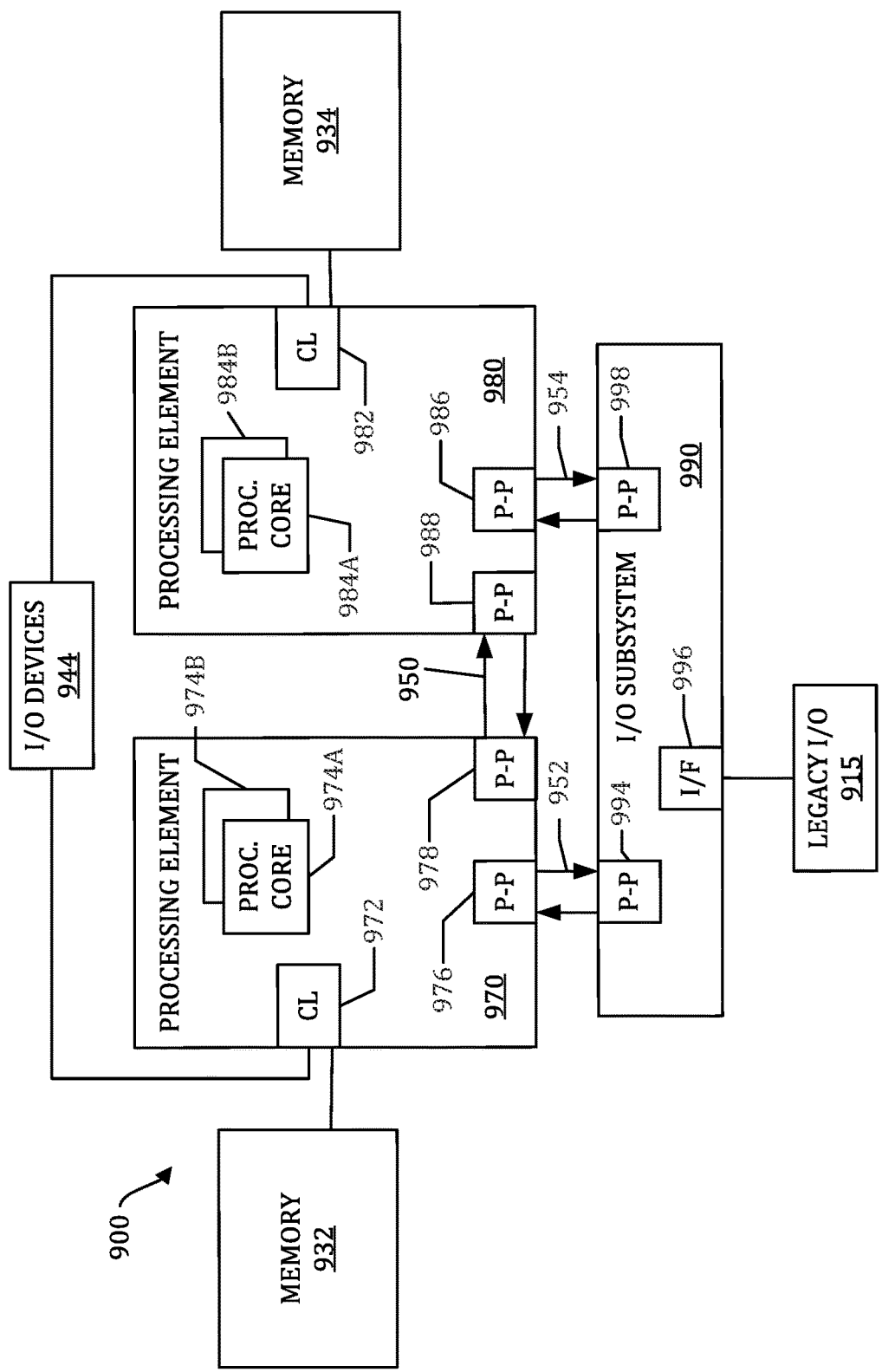
FIG. 9 is a block diagram illustrating a computing device for use with techniques described herein according to another embodiment.

Referring now to FIG. 9, a block diagram illustrates a programmable device 900 according to another embodiment. Certain aspects of FIG. 9 have been omitted from FIG. 8 in order to avoid obscuring other aspects of FIG. 9.

FIG. 9 illustrates that processing elements 970, 980 may include integrated memory and I/O control logic ("CL") 972 and 982, respectively. In some embodiments, the 972, 982 may include memory control logic (MC) such as that described above in connection with FIG. 8. In addition, CL 972, 982 may also include I/O control logic. FIG. 9 illustrates that not only may the memories 932, 934 be coupled to the 972, 982, but also that I/O devices 944 may also be coupled to the control logic 972, 982. Legacy I/O devices 915 may be coupled to the I/O subsystem 990 by interface 996. Each processing element 970, 980 may include multiple processor cores, illustrated in FIG. 8 as processor cores 974A, 974B, 984A, and 984B. As illustrated in FIG. 9, I/O subsystem 990 includes point-to-point (P-P) interconnects 994 and 998 that connect to P-P interconnects 976 and 986 of the processing elements 970 and 980 with links 952 and 954. Processing elements 970 and 980 may also be interconnected by link 950 and interconnects 978 and 988, respectively.

The programmable devices depicted in FIGS. 8 and 9 are schematic illustrations of embodiments of programmable devices, which may be utilized to implement various embodiments discussed herein. Various components of the programmable devices depicted in FIGS. 8 and 9 may be combined in a system-on-a-chip (SoC) architecture.

Figure 10:
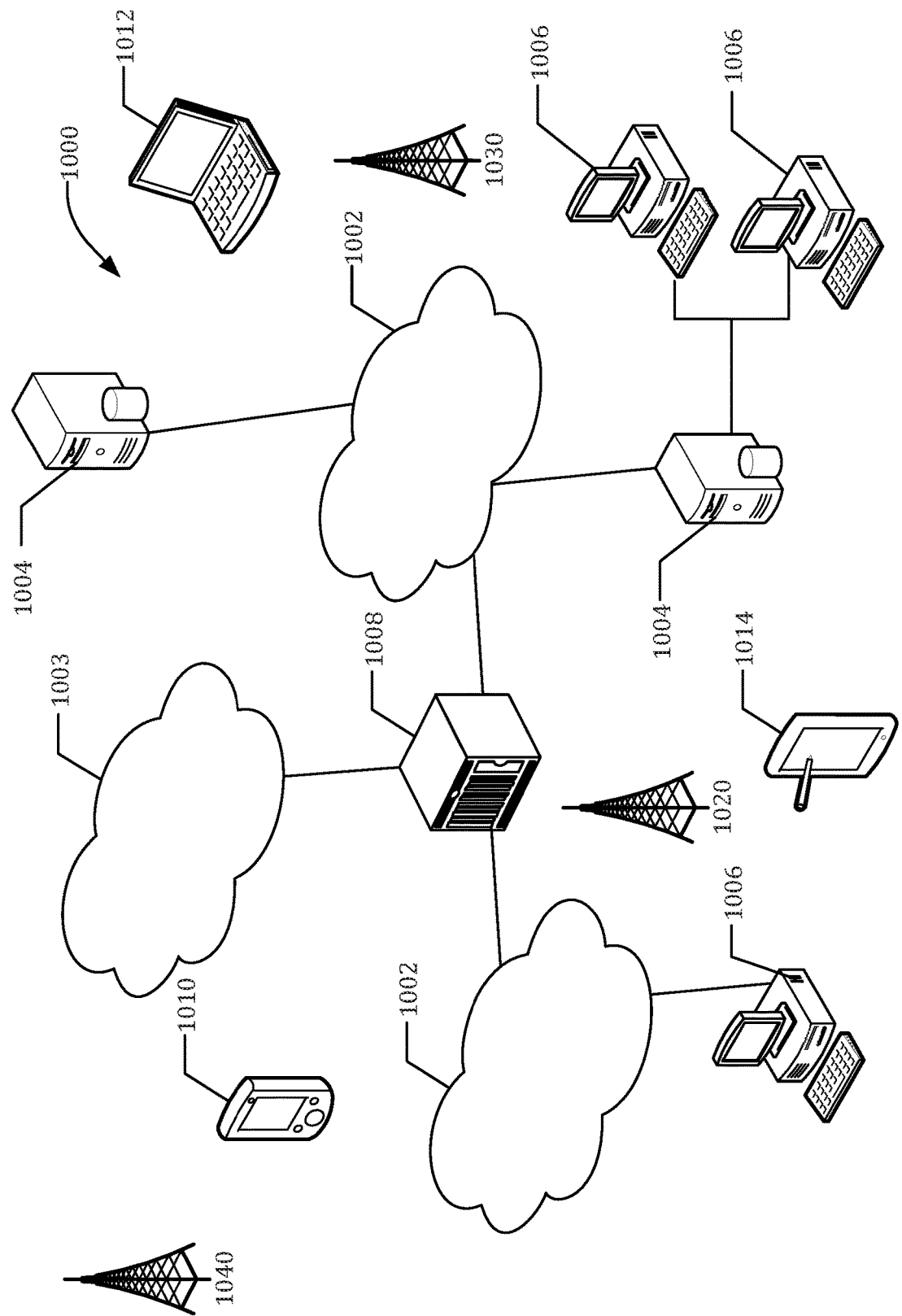
FIG. 10 is a diagram illustrating a network of programmable devices according to one embodiment.

Referring now to FIG. 10, an example infrastructure 1000 in which the techniques described above may be implemented is illustrated schematically. Infrastructure 1000 contains computer networks 1002. Computer networks 1002 may include many different types of computer networks available today, such as the Internet, a corporate network or a Local Area Network (LAN). Each of these networks can contain wired or wireless programmable devices and operate using any number of network protocols (e.g., TCP/IP). Networks 1002 may be connected to gateways and routers (represented by 1008), end user computers 1006, and computer servers 1004. Infrastructure 1000 also includes cellular network 1003 for use with mobile communication devices. Mobile cellular networks support mobile phones and many other types of mobile devices. Mobile devices in the infrastructure 1000 are illustrated as mobile phones 1010, laptops 1012, and tablets 1014. A mobile device such as mobile phone 1010 may interact with one or more mobile provider networks as the mobile device moves, typically interacting with a plurality of mobile network towers 1020, 1030, and 1040 for connecting to the cellular network 1003. Although referred to as a cellular network in FIG. 10, a mobile device may interact with towers of more than one provider network, as well as with multiple non-cellular devices such as wireless access points and routers 1008. In addition, the mobile devices 1010, 1012, and 1014 may interact with non-mobile devices such as computers 1004 and 1006 for desired services, which may include creating navigation objects and exchanging navigation objects between members of a group in order to experience a unified view of the context of other members as described above. The functionality of the clients 104A-114A of FIG. 1 may be implemented in any device or combination of devices illustrated in FIG. 10; however, most commonly is implemented in a firewall or intrusion protection system in a gateway or router.

The following examples pertain to further embodiments.

Example 1 is a machine readable medium, on which are stored instructions, comprising instructions that when executed cause a machine to: receive information from a first client device that is related to navigating to a destination, the first client device being associated with a first member; transmit an invitation to one or more other client devices that is related to participating in a navigation session with the first member; receive an acceptance to the invitation from a second client device of the one or more other client devices responsive to transmitting the invitation, the second client device being associated with a second member; receive a first navigation object from the first client device related to the navigation session; select one of the first and second members as a group leader for the navigation session; transmit the first navigation object to the second client device to create a second navigation object on the second client device responsive to receiving the first navigation object; and receive updated navigation objects to the first and the second navigation objects from each of the first and second client devices as the first and second members navigate to the destination.

In Example 2, the subject matter of Example 1 can optionally include, wherein the instructions further comprise instructions that when executed cause the machine to monitor device activity for each of the first and second navigation objects responsive to receiving the updated navigation objects from the first and the second client devices.

In Example 3, the subject matter of Example 1 to 2 can optionally include, wherein the instructions further comprise instructions that when executed cause the machine to determine the presence of an anomaly in each of the first and second navigation objects responsive to receiving the updated navigation objects from each of the first and the second client devices.

In Example 4, the subject matter of Example 3 can optionally include, wherein the instructions further comprise instructions that when executed cause the machine to determine whether each of the first and second members have one or more of a deviation in navigation, an unexpected stop during navigation, or a mishap during navigation responsive to determining the presence of the anomaly in each of the first and the second client devices.

In Example 5, the subject matter of Example 1 to 4 can optionally include, wherein the instructions further comprise instructions that when executed cause the machine to determine a presence of a trigger event in each of the first and the second navigation objects.

In Example 6, the subject matter of Example 5 can optionally include, wherein the instructions further comprise instructions that when executed cause the machine to create a navigation trigger responsive to a positive determination of the presence of a trigger event.

In Example 7, the subject matter of Example 1 to 6 can optionally include, wherein the instructions that when executed cause the machine to transmit information in each of the first and the second navigation objects to the other client devices in the first and second client devices responsive to receiving the updated navigation objects from each of the first and second client devices.

Example 8 is a computer system for collaborative navigation within a group, comprising: one or more processors; and a memory coupled to the one or more processors, on which are stored instructions, comprising instructions that when executed cause one or more of the processors to: receive information from a first client device that is related to navigating to a destination, the first client device being associated with a first member; transmit an invitation to one or more other client devices that is related to participating in a navigation session with the first member; receive an acceptance to the invitation from a second client device of the one or more other client devices responsive to transmitting the invitation, the second client device being associated with a second member; receive a first navigation object from the first client device related to the navigation session; select one of the first and second members as a group leader for the navigation session; transmit the first navigation object to the second client device to create a second navigation object on the second client device responsive to receiving the first navigation object; and receive updated navigation objects to the first and the second navigation objects from each of the first and second client devices as the first and second members navigate to the destination.

In Example 9, the subject matter of Example 8 can optionally include, wherein the instructions further comprise instructions that when executed cause the one or more processors to monitor device activity for each of the first and second navigation objects responsive to receiving the updated navigation objects from the first and the second client devices.

In Example 10, the subject matter of Example 8 to 9 can optionally include, wherein the instructions further comprise instructions that when executed cause the one or more processors to determine the presence of an anomaly in each of the first and second navigation objects responsive to receiving the updated navigation objects from each of the first and the second client devices.

In Example 11, the subject matter of Example 10 can optionally include, wherein the instructions further comprise instructions that when executed cause the one or more processors to determine whether each of the first and second members have one or more of a deviation in navigation, an unexpected stop during navigation, or a mishap during navigation responsive to determining the presence of the anomaly in each of the first and the second client devices.

In Example 12, the subject matter of Example 8 to 11 can optionally include, wherein the instructions further comprise instructions that when executed cause the one or more processors to determine whether a trigger event is present in each of the first and the second navigation objects.

In Example 13, the subject matter of Example 12 can optionally include, wherein the instructions further comprise instructions that when executed cause the one or more processors to create a navigation trigger responsive to a positive determination of the presence of a trigger event.

In Example 14, the subject matter of Example 8 to 13 can optionally include, wherein the instructions further comprise instructions that when executed cause the one or more processors to transmit information in each of the first and the second navigation objects to the other client devices in the first and second client devices responsive to receiving the updated navigation objects from each of the first and second client devices.

Example 15 is a method for collaborative navigation within a group, comprising: receiving information from a first client device that is related to navigating to a destination, the first client device being associated with a first member; transmitting an invitation to one or more other client devices that is related to participating in a navigation session with the first member; receiving an acceptance to the invitation from a second client device of the one or more other client devices responsive to transmitting the invitation, the second client device being associated with a second member; receiving a first navigation object from the first client device related to the navigation session; selecting one of the first and second members as a group leader for the navigation session; transmitting the first navigation object to the second client device to create a second navigation object on the second client device responsive to receiving the first navigation object; and receiving updated navigation objects to the first and the second navigation objects from each of the first and second client devices as the first and second members navigate to the destination.

In Example 16, the subject matter of Example 15 can optionally include, further comprising monitoring device activity for each of the first and second navigation objects responsive to receiving the updated navigation objects from the first and the second client devices.

In Example 17, the subject matter of Example 15 to 16 can optionally include, further comprising determining the presence of an anomaly in each of the first and second navigation objects responsive to receiving the updated navigation objects from each of the first and the second client devices.

In Example 18, the subject matter of Example 17 can optionally include, further comprising determining whether each of the first and second members have one or more of a deviation in navigation, an unexpected stop during navigation, or a mishap during navigation responsive to determining the presence of the anomaly in each of the first and the second client devices.

In Example 19, the subject matter of Example 15 to 18 can optionally include, further comprising determining a presence of a trigger event in each of the first and the second navigation objects.

In Example 20, the subject matter of Example 15 to 19 can optionally include, further comprising creating a navigation trigger responsive to a positive determination of the presence of a trigger event.

In Example 21, the subject matter of Example 15 to 20 can optionally include, further comprising transmitting information in each of the first and the second navigation objects to the other client devices in the first and second client devices responsive to receiving the updated navigation objects from each of the first and second client devices.

Example 22 is a method for a collaborative shadowme navigation, comprising: receiving with an intelligence engine information from a first client device that is related to navigating to a destination, the first client device being associated with a first member; receiving with the intelligence engine information from a second client device that is related to participating in a navigation session with the first member, the second client device being associated with a second member; receiving with the intelligence engine a navigation object from the second client device that includes information for navigating to the destination by the first member; updating with the intelligence engine the navigation object as the first member navigates to the destination; determining with the intelligence engine whether the second member is actively monitoring the navigation session; and receiving with the intelligence engine a request for a third member to participate in the navigation session responsive to determining that the second member is not actively monitoring the navigation session.

In Example 23, the subject matter of Example 22 can optionally include transmitting information related to audio, video, or textual messages to the first client device responsive to the first member navigating to the destination.

In Example 24, the subject matter of Example 22 to 23 can optionally include determining a presence of a trigger event responsive to receiving the information from the first client device that is related to navigating to the destination; and transmitting an invitation to one or more client devices that is related to participating in the navigation session with the first member responsive to a positive determination of the presence of the trigger event.

In Example 25, the subject matter of Example 24 can optionally include determining whether at least one other client has accepted the invitation responsive to transmitting the invitation.

In Example 26, the subject matter of Example 22 to 25 can optionally include determining whether the first member has reached the destination.

In Example 27, the subject matter of Example 26 can optionally include terminating the navigation session responsive to determining that the first member has reached the destination.

Example 28 is a computer system for collaborative shadowme navigation within a group, comprising: one or more processors; and a memory coupled to the one or more processors, on which are stored instructions, comprising instructions that when executed cause one or more of the processors to: receive information from a first client device that is related to navigating to a destination, the first client device being associated with a first member; receive information from a second client device that is related to participating in a navigation session with the first member, the second client device being associated with a second member; receive a navigation object from the second client device that includes information for navigating to the destination by the first member; update the navigation object as the first member navigates to the destination; determine whether the second member is actively monitoring the navigation session; and receive a request for a third member to participate in the navigation session responsive to determining that the second member is not actively monitoring the navigation session.

In Example 29, the subject matter of Example 28 can optionally include, wherein the instructions further comprise instructions that when executed cause the one or more processors to transmit information related to audio, video, or textual messages to the first client device responsive to the first member navigating to the destination.

In Example 30, the subject matter of Example 28 to 29 can optionally include, wherein the instructions further comprise instructions that when executed cause the one or more processors to: determine a presence of a trigger event responsive to receiving the information from the first client device that is related to navigating to the destination; and transmit an invitation to one or more client devices that is related to participating in the navigation session with the first member.

In Example 31, the subject matter of Example 30 can optionally include, wherein the instructions further comprise instructions that when executed cause the one or more processors to determine whether at least one other client has accepted the invitation responsive to transmitting the invitation.

In Example 32, the subject matter of Example 28 to 31 can optionally include, wherein the instructions further comprise instructions that when executed cause the one or more processors to determine whether the first member has reached the destination.

Example 33 is a machine readable medium, on which are stored instructions, comprising instructions that when executed cause a machine to: receive with an intelligence engine information from a first client device that is related to navigating to a destination, the first client device being associated with a first member; receive with the intelligence engine information from a second client device that is related to participating in a navigation session with the first member, the second client device being associated with a second member; receive with the intelligence engine a navigation object from the second client device that includes information for navigating to the destination by the first member; update with the intelligence engine the navigation object as the first member navigates to the destination; determine with the intelligence engine whether the second member is actively monitoring the navigation session; and receive with the intelligence engine a request for a third member to participate in the navigation session responsive to determining that the second member is not actively monitoring the navigation session.

In Example 34, the subject matter of Example 33 can optionally include, wherein the instructions further comprise instructions that when executed cause the machine to transmit information related to audio, video, or textual messages to the first client device responsive to the first member navigating to the destination.

In Example 35, the subject matter of Example 33 to 34 can optionally include, wherein the instructions further comprise instructions that when executed cause the machine to determine a presence of a trigger event responsive to receiving the information from the first client device that is related to navigating to the destination; and transmit an invitation to one or more client devices that is related to participating in the navigation session with the first member responsive to a positive determination of the presence of the trigger event.

In Example 36, the subject matter of Example 35 can optionally include, wherein the instructions further comprise instructions that when executed cause the machine to determine whether at least one other client has accepted the invitation responsive to transmitting the invitation.

In Example 37, the subject matter of Example 33 to 36 can optionally include, wherein the instructions further comprise instructions that when executed cause the machine to determine whether the first member has reached the destination.

In Example 38, the subject matter of Example 37 can optionally include, wherein the instructions further comprise instructions that when executed cause the machine to terminate the navigation session responsive to determining that the first member has reached the destination.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium comprising instructions that, when executed, cause a server to at least:
    transmit, via a first network communication, an invitation to one or more client devices in communication with the server, the invitation related to participating in a navigation session with a leader client device associated with a first member;
    after receiving a first navigation object from the leader client device via a second network communication, transmit, via a third network communication, the first navigation object to a second client device based on the server receiving an acceptance to the invitation from the second client device, the first navigation object related to the navigation session, the first navigation object including a first route to a destination for the second client device, and the second client device associated with a second member; and
    after receiving an updated navigation object via a fourth network communication from the second client device that is separate from the leader client device, transmit, via a fifth network communication, the updated navigation object to the leader client device, the updated navigation object including sensor information from the second client device indicating a location of the second client device and a modified version of the first route customized for the second client device.

2. The non-transitory machine readable medium of claim 1, wherein the instructions, when executed, further cause the server to, responsive to receiving the updated navigation object from the second client device, monitor device activity for at least one of the first member or a second navigation object from the second client device.

3. The non-transitory machine readable medium of claim 1, wherein the instructions, when executed, further cause the server to, responsive to receiving the updated navigation object from the second client device, determine whether an anomaly is present in at least one of the first navigation object or a second navigation object from the second client device.

4. The non-transitory machine readable medium of claim 3, wherein the instructions, when executed, further cause the server to determine whether at least one of the first member or the second member have one or more of a deviation in navigation, an unexpected stop during navigation, or a mishap during navigation responsive to determining the presence of the anomaly in at least one of the first navigation object or the second navigation object.

5. The non-transitory machine readable medium of claim 1, wherein the instructions, when executed, further cause the server to determine a presence of a trigger event in at least one of the first navigation object or a second navigation object from the second client device.

6. The non-transitory machine readable medium of claim 5, wherein the instructions, when executed, further cause the server to create a navigation trigger responsive to a positive determination of the presence of the trigger event.

7. The non-transitory machine readable medium of claim 1, wherein the instructions, when executed, further cause the server to transmit information in the first navigation object to the one or more client devices responsive to receiving the updated navigation object from the second client device.

8. A computer system for collaborative navigation within a group, the computer system comprising:
one or more processors; and
memory coupled to the one or more processors, the memory including instructions that, when executed, cause the one or more processors to:
transmit, via a first network communication, an invitation to one or more client devices in communication with the one or more processors, the invitation related to participating in a navigation session with a leader client device associated with a first member;
after receiving a first navigation object from the leader client device via a second network communication, transmit, via a third network communication, the first navigation object to a second client device based on the one or more processors determining that an acceptance to the invitation has been received from the second client device, the first navigation object related to the navigation session, the first navigation object including a first route to a destination for the second client device, and the second client device associated with a second member; and
after receiving an updated navigation object via a fourth network communication from the second client device that is separate from the leader client device, transmit, via a fifth network communication, the updated navigation object to the leader client device, the updated navigation object including sensor information from the second client device indicating a location of the second client device and a modified version of the first route customized for the second client device.

9. The computer system of claim 8, wherein the instructions, when executed, further cause the one or more processors to, responsive to receiving the updated navigation object from the second client device, monitor device activity for at least one of the first navigation object or a second navigation object from the second client device.

10. The computer system of claim 8, wherein the instructions, when executed, further cause the one or more processors to, responsive to receiving the updated navigation object from the second client device, determine whether an anomaly is present in at least one of the first navigation object or a second navigation object from the second client device.

11. The computer system of claim 10, wherein the instructions, when executed, further cause the one or more processors to determine whether at least one of the first member or the second member have one or more of a deviation in navigation, an unexpected stop during navigation, or a mishap during navigation responsive to determining the presence of the anomaly in at least one of the first navigation object or the second navigation object.

12. The computer system of claim 8, wherein the instructions, when executed, further cause the one or more processors to determine whether a trigger event is present in at least one of the first navigation object or a second navigation object from the second client device.

13. The computer system of claim 12, wherein the instructions, when executed, further cause the one or more processors to create a navigation trigger responsive to a positive determination of the presence of the trigger event.

14. The computer system of claim 8, wherein the instructions, when executed, further cause the one or more processors to transmit information in the first navigation object to the one or more client devices responsive to receiving the updated navigation object from the second client device.

15. A method for collaborative navigation within a group coordinated by a server, the method comprising:
transmitting, via a first network communication, an invitation to one or more client devices in communication with the server, the invitation related to participating in a navigation session with a leader client device associated with a first member;
after receiving a first navigation object from the leader client device via a second network communication, transmitting, via a third network communication, the first navigation object to a second client device based on the server receiving an acceptance to the invitation, the first navigation object related to the navigation session, the first navigation object including a first route to a destination for the second client device, and the second client device associated with a second member; and
after receiving an updated navigation object via a fourth network communication from the second client device that is separate from the leader client device, transmitting, via a fifth network communication, the updated navigation object to the leader client device, the updated navigation object including sensor information from the second client device indicating a location of the second client device and a modified version of the first route customized for the second client device.

16. The method of claim 15, further including, responsive to receiving the updated navigation object from the second client device, monitoring device activity for at least one of the first navigation object or a second navigation object from the second client device.

17. The method of claim 15, further including, responsive to receiving the updated navigation object from the second client device, determining whether an anomaly is present in at least one of the first navigation object or a second navigation object from the second client device.

18. The method of claim 17, further including determining whether at least one of the first member or the second member have one or more of a deviation in navigation, an unexpected stop during navigation, or a mishap during navigation responsive to determining the presence of the anomaly in at least one of the first navigation object or the second navigation object.

19. The method of claim 15, further including determining a presence of a trigger event in at least one of the first navigation object or a second navigation object from the second client device.

20. The method of claim 19, further including creating a navigation trigger responsive to a positive determination of the presence of the trigger event.

21. The method of claim 15, further including transmitting information in the first navigation object to the one or more client devices responsive to receiving the updated navigation object from the second client device.

* * * * *